United States Patent Office 3,674,454
Patented July 4, 1972

3,674,454
ION EXCHANGE OF GLASS WITH USE
OF CARBON DIOXIDE
Elime Plumat, Gilly, and Francois Toussaint, Lodelinsart, Belgium, assignors to Glaverbel S.A., Watermael-Boitsfort, Belgium
No Drawing. Filed Sept. 12, 1969, Ser. No. 857,567
Claims priority, application Luxembourg, Sept. 12, 1968, 56,873/68
Int. Cl. C03c 21/00
U.S. Cl. 65—30            9 Claims

ABSTRACT OF THE DISCLOSURE

In order to improve the repeatability and reaction speed of processes for modifying a property of a glass, vitrocrystalline, ceramic, or stone body by diffusing at least one substance into the body from a contacting treatment medium containing a molten nitrate salt, $CO_2$ is brought into contact with such medium during the diffusion operation.

BACKGROUND OF THE INVENTION

This invention relates to the diffusion of substances into glass, vitrocrystalline material, ceramic or stone in order to modify a property or properties thereof.

It is known to cause substances to diffuse into glass bodies from contacting media consisting of or containing a molten nitrate salt. By this means, various modifications can be achieved depending on the nature of the diffusing substance and the conditions existing in the process. By way of example, the diffusion may bring about a change in the surface composition of the glass or an increase in its tensile strength.

It has thus far been found to be difficult to carry out such diffusion treatments on an industrial mass production basis so as to obtain predictable and consistent results. One difficulty is that of ensuring that diffusion proceeds sufficiently and predictably in a predetermined period of time. Sometimes diffusion is predictably delayed after the establishment of the conditions under which diffusion should occur, or the diffusion, having commenced, begins to slow down or even stops so that at the end of the allotted period the required modification has not been achieved.

SUMMARY OF THE INVENTION

It is a primary object of the present invention to overcome, or at least substantially reduce, these drawbacks and difficulties.

Another object of the invention is to improve the repeatability of such diffusion treatments.

A further object of the invention is to increase the reaction speed of such processes.

A yet further object of the invention is to render the rate at which such diffusion occurs more nearly constant.

The present invention is based on the discovery that substantial advantages are gained if the diffusion from a medium consisting of or containing a nitrate salt is carried out while said medium is in contact with $CO_2$.

Thus, the objects according to the invention are achieved, in a process wherein at least one property of a body of glass, vitrocrystalline material, ceramic or stone is modified as a result of the diffusion of at least one substance into the body from a contacting medium consisting of or containing a molten nitrate salt, by the improvement involving the step of causing diffusion to occur while the medium is in contact with $CO_2$.

In comparative tests in which glass bodies of identical composition were treated it was found that in cases in which a medium in contact with $CO_2$ was used, the diffusion commenced much more quickly than when the same medium under the same conditions save for the absence of $CO_2$. Similar advantages were obtained in tests on bodies of vitrocrystalline material.

The reasons for the beneficial results of using $CO_2$ gas are not yet very well understood. Possibly the result is due to some influence which the $CO_2$ has on dissociation or on dissociation and recombination reactions in the treatment medium, giving rise to the presence of O⁻⁻ ions which, in their turn, promote the start of the diffusion.

In view of the effect of the $CO_2$, a given modification of the treated body can be brought about with the treatment medium at a lower temperature than was hitherto required and this is beneficial, particularly for avoiding any undesirable deformations of the body.

The invention enables a given treatment, e.g., a given chemical tempering, to be performed in a treatment period appreciably shorter than hitherto with the result that chemically tempered and otherwise treated articles can be produced more economically.

It is not necessary, when carrying out the invention, for the $CO_2$ to be present for the entire period during which a substance or substances diffuse into the body from a contacting medium. Improvements result if the $CO_2$ is present during only an initial part of the total period during which the diffusion takes place.

It is of course not necessary for the medium from which diffusion takes place to contact the whole of the body being treated. While such overall treatment may often be desirable, in certain cases it may be preferable to confine the treatment to a part of the body, e.g., in the case of a sheet of glass, to confine the treatment to marginal or edge portions of the sheet in order to modify the appearance of, or to strengthen, only those portions.

The invention is of particular interest in the field of chemical tempering. It is known that glass can be strengthened by a chemical tempering process in which a substance is caused to enter the glass from a contacting medium and the temperature during and after such entry is controlled so that exterior layers of the glass are placed in a state of compressive stress or of increased compressive stress.

Usually, chemical tempering involves the replacement of ions in the glass by ions deriving from the contacting treatment medium. It is possible for example to set up compressive stresses by replacing ions in exterior layers of the glass with ions which confer a lower coefficient of thermal expansion on such exterior layers, this replacement occurring at a temperature which is sufficiently high and which is maintained sufficiently long for stress relaxation to occur, and subsequently allowing the glass to cool. Alternatively, surface compressive stresses can be set up by replacing ions in exterior layers of the glass with larger ions while the surface layers of the glass are at an elevated temperature which, however, is too low to allow substantial, or at least complete, stress relaxation to occur during the time for which such temperature is maintained, the glass being then cooled to normal temperature so that the induced stresses are "frozen" in. Furthermore, it is possible to introduce compressive surface stresses by causing ions to enter the glass through a surface thereof from a contacting medium under the influence of an electric field, without any accompanying balancing movement of ions from the glass into the contacting medium through that surface.

A chemical tempering process can be applied not only to a body of glass but also to a body of vitrocrystalline material. As applied to such a body, the tempering treatment gives the best results when the phase of the vitrocrystalline material which is susceptible to the greater or greatest amount of diffusion of substance from the contacting medium is well dispersed throughout the surface of the body. A chemical tempering process can also be applied to a body of ceramic or stone provided that there are present at the surface of the material a sufficient number of ions which are mobile at the temperature of the treatment to permit surface compressive stresses to be set up or increased by the introduction or exchange of ions.

In the described chemical tempering processes, the diffusion of a substance into the body being treated is usually part of an ion exchange between the body and the contacting medium. Special importance is attached to processes according to the invention wherein the diffusion is part of an ion exchange phenomenon, and particularly to processes in which it is an exchange of alkali metal ions.

It is, however, to be understood that ion exchange is not essential to the invention. To cite an example of an alternative type of process, it is possible to cause ions to enter a body of glass, vitrocrystalline material, ceramic or stone from a contacting medium, without a simultaneous movement of ions from the body into the medium, by bringing about the diffusion under the influence of an applied electric field which may be a continuous or intermittent direct field or an alternating field, and the invention is applicable in that type of process.

DESCRIPTION OF THE PREFERRED EMBODIMENTS

In the presently preferred embodiments of the invention, potassium ions enter the body from the contacting medium in exchange for sodium ions under conditions such as to effect tempering of the body. In such processes the treatment medium preferably comprises molten potassium nitrate.

The molten medium may constitute a bath into which the body to be treated or a part thereof is immersed for the diffusion period. Alternatively a continuous or atomized stream or streams of the medium may be directed onto the body or part thereof and allowed to stream along the surface or surfaces of the body through which the diffusion is to take place. There is an advantage in this way of contacting the body with the treatment medium in that the uniformity of treatment of the surface or surfaces wetted by the medium is promoted.

When using a molten medium in the form of a treatment bath, the $CO_2$ gas can be bubbled through the bath. By appropriately injecting the gas it can be ensured that even in a bath of large size the gas is distributed throughout the bath and that, furthermore, any dissociation and recombination products, depending on the specific process, are distributed in the bath instead of remaining confined to the place of their formation and thus preventing or slowing down any subsequent reaction. The initiation of diffusion is thus very favorably promoted by the bubbling of $CO_2$ through the medium.

Preferably the $CO_2$ gas is mixed with air. This mixture further increases the starting speed of the diffusion, probably by further acting on the $O^{--}$ ion content of the bath.

Preferably the quantity of $CO_2$ blown into contact with the molten salt is at least 0.1 liter/min./m.$^3$ of salt at standard temperature and pressure conditions. If desired, the $CO_2$ gas can be used in the form of a mixture with an inert gas such as nitrogen.

The $CO_2$ and any other gas used in the process can be blown in a continuous or intermittent manner.

In the event that the treatment medium is streamed along the body to be treated, as hereinbefore suggested, the $CO_2$ and any other gas which is used can be blown simultaneously against the surface or surfaces of the body so as to contact the medium streaming thereover.

The invention will now be illustrated by a number of specific examples.

EXAMPLE 1

A sheet of ordinary soda-lime glass was immersed in a bath of molten potassium nitrate at a temperature of 470° C. and remained immersed for a period of 20 hours. $CO_2$ gas was bubbled through the bath for the whole of that period. The gas was supplied at a rate of 2 liters per minute, the volume occupied by the liquid nitrate being 1 m.$^3$.

Examination of the glass sheet after its withdrawal from the bath showed that potassium ions deriving from the molten nitrate salt had replaced sodium ions initially in the glass up to a depth of 30 microns from each surface of the sheet. This penetration was determined by means of a microsonde, or "microprobe." In consequence of the ion exchange, the glass sheet had appreciably greater tensile strength than before the treatment.

In a comparative test performed on an identical glass sheet under identical conditions save in that $CO_2$ was not employed, no potassium ions could be detected in the glass sheet after its withdrawal from the bath.

EXAMPLE 2

Sheets of soda-lime glass formed from the following composition (percentages by weight):

| | Percent |
|---|---|
| $SiO_2$ | 68 |
| $Na_2O$ | 22.5 |
| CaO | 9.5 | where chemically tempered by sprinkling the sheet with $RbNO_3$ at 445° C. The rubidium nitrate streamed continuously along the surfaces of the glass sheets for two days. Examination of the sheets showed that no rubidium ions had diffused into the glass. The room in which the process was performed was then filled with $CO_2$ at a pressure of one-third of an atmosphere.

The rubidium ions diffused into the glass and after 30 hours of treatment there was already noted a marked increase in the tensile strength of the glass sheets.

EXAMPLE 3

One of three batches of sheets of glass formed from the following composition (percentages by weight):

| | Percent |
|---|---|
| $SiO_2$ | 71 |
| $Al_2O_3$ | 2 |
| $Na_2O$ | 13 |
| CaO | 12 | and measuring 1.60 m. x 55 cm. x 1 mm. was immersed in 8 m.$^3$ of a mixture comprising 99.8% by weight of $KNO_3$ and 0.2% by weight of $K_2CO_3$, the temperature of the bath being 468° C. After 20 hours the sheets were withdrawn from the bath. No ion exchange between the glass and the molten material of the bath had taken place.

In a second test another of the three batches of sheets was immersed for 20 hours in a bath of the same composition but having a temperature of 485° C. An appreciable ion exchange took place during that period but the sheets were deformed as a result of their exposure to the higher temperature.

In a third test, the third batch of sheets were immersed for 20 hours in a bath of the same composition and at the same temperature (468° C.) as that used in the first test, and $CO_2$ and air, mixed together, were blown through the bath at a rate of 10 liters per minute of $CO_2$ and 40 liters per minute of air. The sheets were withdrawn from the bath after 20 hours and it was found that potassium ions had penetrated into the sheets up to a depth of 30 microns from the sheet surfaces, resulting in an appreciable increase in the tensile strength of the sheets. The sheets were free from deformation.

EXAMPLE 4

A few of the batch of sheets referred to in the second part of Example 2, which had been strengthened by the diffusion of rubidium ions into the glass in exchange for sodium ions, were kept for one month in an ambient atmosphere at 20° C. and were then immersed for 20 minutes in a molten salt bath composed of 98%, by weight, $NaNO_3$ and 2%, by weight, $LiNO_3$ and having a temperature of 440° C. No ion exchange between the sheets and the molten medium took place during that period. Some of the sheets were left in the bath and $CO_2$ was then blown through the bath at a rate of 4 liters per minute and per cubic meter of liquid. After a period of twenty minutes, appreciable amounts of lithium and sodium ions were found in the glass in addition to the rubidium ions.

EXAMPLE 5

A few of the sheets of glass referred to in the second part of Example 2 were, immediately after their withdrawal from the room in which the diffusion of rubidium ions into the glass took place, immersed in a molten salt bath composed of 98%, by weight, $NaNO_3$ and 2%, by weight, $LiNO_3$ at 440° C. Ion exchange took place between the rubidium ions in the glass sheets and the sodium and lithium ions in the molten salt bath, despite the absence of $CO_2$. This was probably due to the fact that the surfaces of the glass sheets remained active after the initiation of the exchange of rubidium for sodium ions in the first treatment performed in the presence of $CO_2$.

EXAMPLE 6

A few of a batch of identical pieces of ceramic material formed from the following composition (percentages by weight):

| | Percent |
|---|---|
| $Al_2O_3$ | 40 |
| $SiO_2$ | 55 |
| $Na_2O$ | 2 | were immersed in a bath of pure potassium nitrate at 450° C. and during the immersion the samples were subjected to a direct electric field the mean value of which, between electrodes, was 50 v./cm., the electrodes being located abreast of the samples. After a period of ten hours some of the pieces were withdrawn from the bath for examination, and a mixture of $CO_2$ and air was blown through the bath still containing the other pieces, the electric field being maintained. The mixture was composed of 1 volume of $CO_2$ for three volumes of air. This mixture was blown through the bath at a rate of 1 liter per minute and per cubic meter of nitrate.

It was found from an examination of the withdrawn pieces that little or no ion exchange between the pieces and the molten salt had taken place during the ten-hour immersion period. The pieces left in the bath were withdrawn after a further period of one hour and it was found that in that period potassium ions had diffused into the pieces up to a depth of 70 microns.

In another comparative test the remaining pieces of the initial batch, not previously treated, were subjected to a similar test in the presence of $CO_2$, but an alternating electric field having a frequency of 6 cycles/hour was used. The $CO_2$ was added together with air and in the same proportion and at the same rate as above. In that case potassium ions penetrated to a depth of 25 microns into the sample pieces on both sides.

EXAMPLE 7

A piece of nepheline ($Na_3KAl_4Si_4O_{16}$) was immersed in a bath of $KNO_3$ having a temperature of 470° C. No diffusion of ions into the rock took place during an immersion period of 30 hours. In a comparative test on an identical piece of stone, in which the conditions were the same as before with the sole exception that a mixture of air and $CO_2$ in a volume ratio of 3:1 was blown through the bath, an appreciable amount of potassium ions diffused into the rock in exchange for sodium ions during the period of 30 hours immersion with the result that the mechanical strength of the piece of stone was increased. The mixture of gases was blown at a rate of 10 liters per minute and per cubic meter of liquid bath.

EXAMPLE 8

Sheets of vitrocrystalline material formed from the following composition (percentages by weight):

| | Percent |
|---|---|
| $SiO_2$ | 48 |
| $Al_2O_3$ | 32 |
| $Na_2O$ | 10 |
| $CaO$ | 2 |
| $TiO_2$ | 8 | were immersed in different baths each composed of potassium nitrate at 500° C. No diffusion of potassium ions into the sheets took place during a period of 5 hours. At the end of that period $CO_2$ was bubbled through some of the baths at rates ranging from 0.1 liter to 15 liters per minute and per cubic meter of bath. In those baths, appreciable diffusion of potassium ions into the sheets in exchange for sodium ions in the vitreous phase at the sheet surfaces took place during the succeeding period of 5 hours, whereas in the other baths diffusion still did not occur.

It will be understood that the above description of the present invention is susceptible to various modifications, changes and adaptations.

We claim:

1. In a process for modifying a property of a glass, vitrocrystalline, ceramic, or stone body into which ions of an alkali metal can diffuse for inducing compressive stresses in a surface layer thereof by diffusing ions of at least one such alkali metal into the body from a contacting treatment medium containing a molten alkali metal nitrate salt, the improvement comprising the step of bringing $CO_2$ into contact with such medium during said diffusing operation in a concentration sufficient to accelerate the diffusion of such alkali metal ions into the body.

2. A process as defined in claim 1 wherein said step of diffusing is performed as part of an ion exchange operation which serves to increase the tensile strength of the body, the body initially containing exchangeable alkali metal ions, the medium initially containing exchangeable alkali metal ions of a size different from those initially in the body and the step of diffusing involving replacing ions initially in the body by ions of such different type initially contained in the medium.

3. A process as defined in claim 2 wherein said body initially contains sodium ions and said diffusion operation comprises diffusing potassium ions into the body in exchange for such sodium ions.

4. A process as defined in claim 1 wherein said step of bringing $CO_2$ into contact with such medium is carried out by mixing $CO_2$ with air and bringing the resulting mixture into contact with such medium.

5. A process as defined in claim 1 wherein the treatment medium is in the form of a bath and said step of diffusing is carried out while the body is immersed in the bath.

6. A process as defined in claim 5 wherein said step of bringing $CO_2$ into contact is carried out by bubbling $CO_2$ through the bath.

7. A process as defined in claim 1 wherein said step of bringing $CO_2$ into contact with such medium is carried out by delivering $CO_2$ at a rate of at least 0.1 liter per minute to the medium for each cubic meter of alkali metal nitrate salt contained in the medium.

8. A process as defined in claim 1 wherein said step of diffusing is carried out by supplying at least one continuous stream of the medium to the body and causing the medium to flow along the body.

9. A process as defined in claim 1 comprising the further step of subjecting the body to the influence of an electric field during at least part of said diffusing operation.

References Cited

UNITED STATES PATENTS

| | | | |
|---|---|---|---|
| 3,287,201 | 11/1966 | Chisholm et al. | 65—30 X |
| 2,146,224 | 2/1939 | Phillips | 65—30 UX |
| 3,467,508 | 9/1969 | Loukes et al. | 65—30 |

S. LEON BASHORE, Primary Examiner

R. L. LINDSAY, Jr., Assistant Examiner

U.S. Cl. X.R.

161—1

UNITED STATES PATENT OFFICE
CERTIFICATE OF CORRECTION

Patent No. 3,674,454            Dated July 4th, 1972

Inventor(s) Emile Plumat and Francois Toussaint

It is certified that error appears in the above-identified patent and that said Letters Patent are hereby corrected as shown below:

Column 1, in the heading of the patent, line 4, change "Elime" to --Emile--; line 9, after "56,873/68" insert -- ; Great Britain, August 15, 1969, 40,892/69--; line 41, change "predictably" to --unpredictably--. Column 2, line 9, after "when" insert --using--. Column 4, line 41, change "where" to --were--.

Signed and sealed this 6th day of March 1973.

(SEAL)
Attest:

EDWARD M. FLETCHER, JR.
Attesting Officer

ROBERT GOTTSCHALK
Commissioner of Patents